United States Patent [19]

Yamashita

[11] 4,026,497
[45] May 31, 1977

[54] PAUSE DEVICE FOR TAPE RECORDER

[75] Inventor: Noriyuki Yamashita, Tokyo, Japan

[73] Assignee: Sony Corporation, Tokyo, Japan

[22] Filed: Dec. 23, 1975

[21] Appl. No.: 643,809

Related U.S. Application Data

[63] Continuation-in-part of Ser. No. 503,099, Sept. 4, 1974, abandoned.

[30] Foreign Application Priority Data

Sept. 17, 1973 Japan ............................ 48-108598

[52] U.S. Cl. ................................. 242/206; 226/120
[51] Int. Cl.² ..................... G03B 1/04; G11B 15/32
[58] Field of Search .......................... 242/186–191, 242/200, 201–206, 180; 226/120, 124; 360/71, 74

[56] References Cited

UNITED STATES PATENTS

| | | | |
|---|---|---|---|
| 3,687,395 | 8/1972 | Goshima et al. | 242/180 |
| 3,697,015 | 10/1972 | Iwata | 242/186 |
| 3,779,498 | 12/1973 | Takashima | 242/204 |
| 3,921,215 | 11/1975 | Asami | 360/74 |

Primary Examiner—Leonard D. Christian
Attorney, Agent, or Firm—Lewis H. Eslinger; Alvin Sinderbrand

[57] ABSTRACT

In a tape recorder in which a pinch roller is pressed against a motor-driven capstan to move a magnetic tape at a constant speed, a pause device includes an actuator connected to a pinch roller carrier to stop the tape movement by separating the pinch roller from the capstan. Continued movement of the actuator to an over-stroke position latches a switch controller to the actuator, and release of the actuator to an intermediate position draws the switch controller with it to allow a switch in the power supply circuit of the motor to open, stopping the motor after the tape has stopped. Restarting from the paused condition involves moving the actuator to the over-stroke position to release the switch actuator, then allowing the actuator to return by spring force to the unactuated position to allow the pinch roller to resume pressing the tape against the capstan.

8 Claims, 5 Drawing Figures

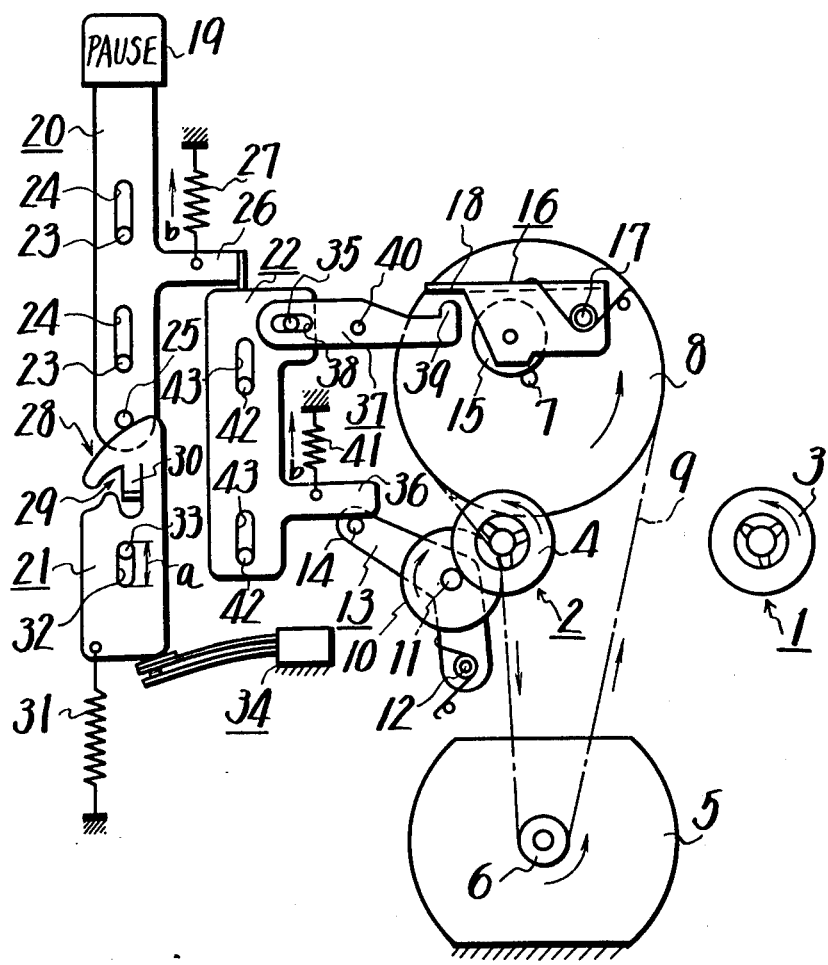
Fig. 1
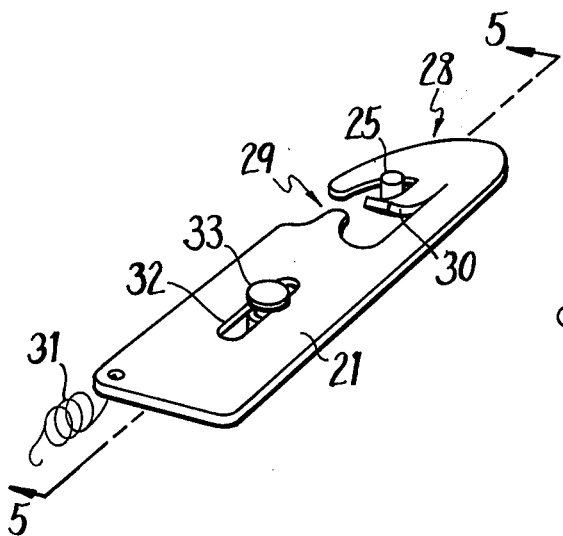
Fig. 4
Fig. 5

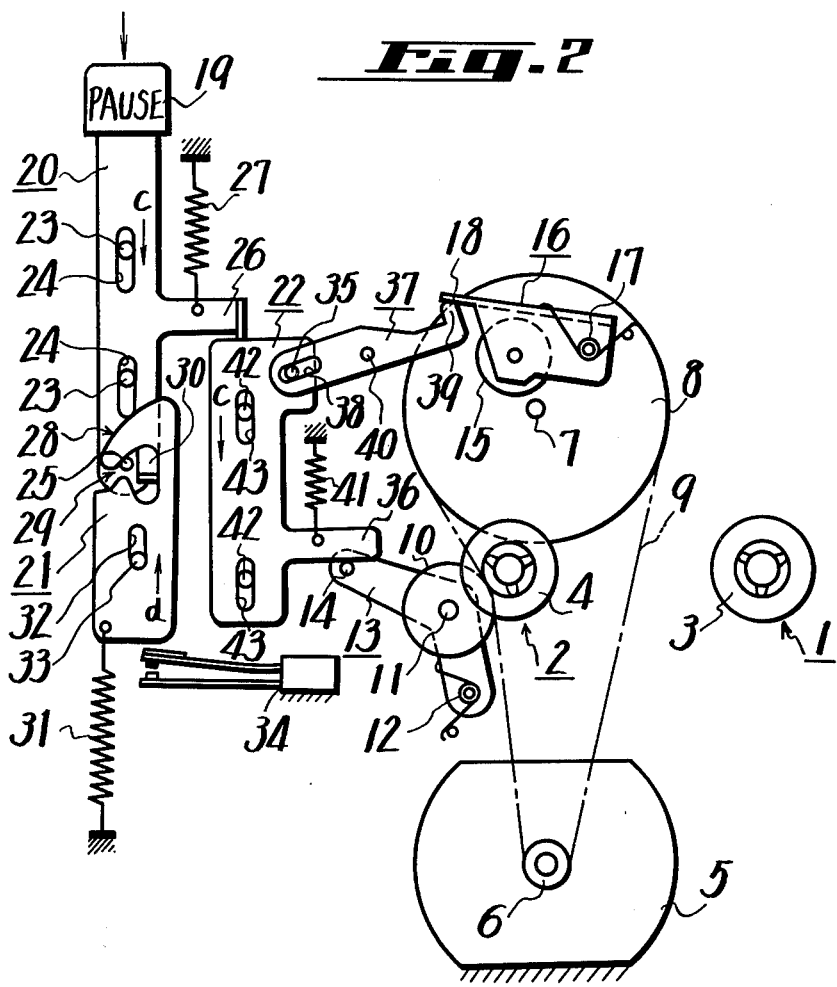
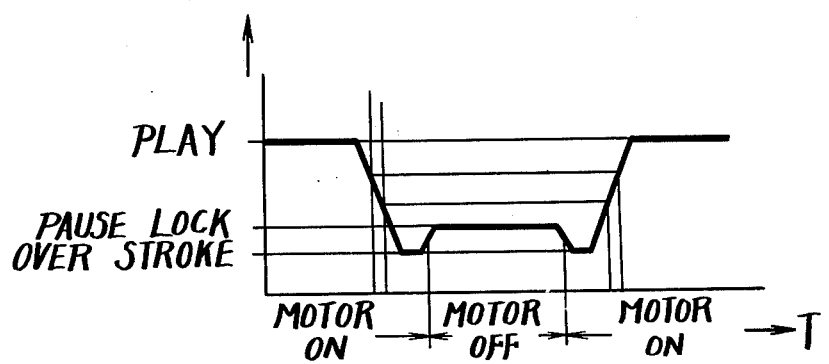

PAUSE DEVICE FOR TAPE RECORDER

This is a continuation-in-part of Applicant's copending application Ser No. 503,099, filed Sept. 4, 1974 and now abandoned.

BACKGROUND OF THE INVENTION

1. Field of the Invention

This invention relates to a pause device for a tape recorder. In particular it relates to a pause device that first removes driving force from the tape and then stops the motor, and returns to normal operation in reverse sequence.

2. Description of the Prior Art

Electrical devices have been known in which a motor power supply circuit is opened by a switch during recording or reproducing operations, and mechanical pause systems have been known in which the pinch roller is separated from the capstan and a take-up reel holder is stopped in response to actuation of a control.

The electrical system is subject to inertia caused by the motor or the driving system at the initiation of both its pause and release operations. Consequently, the tape is stopped slowly and, upon starting again, does not quickly return to normal speed. Such a system is not suitable for performing operations in which the tape must be stopped precisely and restarted in such a way as to return to its correct speed very quickly. Tape editing is one such operation.

In the mechanical systems, the pause and start of the tape movement are rapid, but the motor is kept in operation, which wastes battery power even during the time the tape is momentarily stopped.

SUMMARY OF THE INVENTION

It is an object of this invention to provide a novel pause device for a tape recorder in which the pause and restart of the tape movement can be achieved promptly by mechanical pause means and in which the motor power supply circuit can be opened with a predetermined timing just before the mechanical pause means stops the tape and can be closed just before the pause means returns the apparatus to its tape driving condition.

It is another object of this invention to provide a pause device for a tape recorder in which the battery that drives the motor is prevented from having its power wasted during a pause.

It is a further object of this invention to provide a pause device of extremely simple construction for a tape recorder.

Other objects, features, and advantages of the present invention will be apparent from the following description taken in conjunction with the accompanying drawing.

In accordance with the objects of this invention a pause device is provided in which a mechanical linkage connected to a pause control pushbutton responds to pressure on the pushbutton by moving the pinch roller away from the capstan so that it no longer exerts pressure against the tape. At the same time the apparatus withdraws driving force from the takeup reel so that there is no force to cause the tape to continue its forward motion. Continued pressure on the pause control pushbutton moves it into an over-stroke position that engages a latch that controls the operation of a switch. Releasing pressure on the pause control pushbutton allows the pushbutton to move back to an intermediate position, drawing the latch with it and removing pressure from the switch. This allows the switch to open and, since the switch is connected to the drive motor of the tape recorder, interrupts power to the drive motor.

In order to resume normal operation, the pause control pushbutton is again depressed to its over-stroke position, thereby releasing the latch and closing the switch to restart the motor. When the pause control pushbutton is released the second time, it returns all the way to its initial position, and the linkage connected to it causes the take-up power to be applied again to the take-up reel and causes the pinch roller to be pressed against the tape to force the tape into driving relationship with the capstan.

BRIEF DESCRIPTION OF THE DRAWINGS

FIG. 1 is a plan view showing one example of a pause device according to this invention.

FIG. 2 is a plan view of the apparatus in FIG. 1 showing the pause device in its pause state.

FIG. 3 is a graph showing the relationship between the respective movements in the pause and release operations and the ON-OFF states of the motor power supply.

FIG. 4 is a perspective view of the lock plate in FIGS. 1 and 2.

FIG. 5 is a cross sectional view of the lock plate in FIG. 4.

DESCRIPTION OF THE PREFERRED EMBODIMENT

FIG. 1 shows a supply reel holder 1 and a take-up reel holder 2 and the respective wheels 3 and 4 to be driven by the holders. The apparatus shown also includes a motor 5, a motor pulley 6, a capstan 7, and a flywheel 8. A rubber belt 9 is stretched between the motor pulley 6 and the flywheel 8 and is indicated by a broken line.

A pulley 10, which is in contact with the return side of the belt 9 to be driven in a clockwise direction, and a roller 11 are mounted on a common shaft. When the apparatus is being played, either to record or to playback, the roller 11 is brought into contact with the periphery of the wheel 4 to rotate the take-up reel holder 2 counterclockwise. The pulley 10 is rotatably mounted on one portion of a bent arm 13 pivotally mounted at one end on an acle 12 and resiliently biased clockwise to force the roller 11 against the periphery of the wheel 4. A pin 14 extends from the other end of the arm 13.

The apparatus in FIG. 1 is illustrated in its operating condition in which a pinch roller 15 is pressed against the capstan 7, which is rotating at a constant speed. The roller 15 is rotatably mounted on a pinch lever 16 pivotally mounted on a pivot pin 17 and resiliently biased counterclockwise to press the roller 15 against the capstan. The pivot pin, in turn, is supported by a head base plate (not shown). A projection 18 extends from the free end of the lever 16.

In accordance with this invention, the tape driving apparatus is provided with a pause control actuated by pressure applied to a pushbutton 19 mounted on a handling slide 20. The pause control also includes a lock plate 21 and a pause slide 22. The handling slide 20 is slidable lengthwise and is guided by two pins 23 mounted on a chassis and extending into two slots 24 in the slide 20. The handling slide 20 has a lock pin 25 at its other end and an extension 26 on its right side to press against one end of the pause slide 22. A spring 27 coupled to the extension 26 biases the slide 20 in the direction indicated by an arrow b.

The lock plate 21 includes an arcuate end 28, which is engaged by the lock pin 25, and a channel 29, and a release member 30. The lock plate 21 is slightly movable vertically with one point near the other end thereof being pivoted and biased counterclockwise by a spring 31 that is weaker than the spring 27.

In accordance with this invention, instead of pivoting one point of the lock plate 21, that point is replaced by a slot 32 of length a, and a pin 33, which may be mounted on the chassis, extends into this slot to limit the lock plate 21 to generally longitudinal movement. A leaf spring switch 34 is located adjacent the lock plate 21 to be opened and closed by such longitudinal movement. The leaf spring switch 34 is connected in a power supply circuit for the motor 5 to turn the motor on and off according to a predetermined timing which will be described hereinafter.

The pause slide 22 is also slidable longitudinally following the movement of the handling slide 20, and a projection at one end has a pin 35 extending from it. Another projection 36, which is located near the other end of the slide 22 engages the pin 14 of the arm 13. A centrally pivoted lever 37 has a slot 38 and projection 39 at the other end to engage the projection 18 and rotate the pinch level 16 clockwise during the pause operation. The slot 38 engages the pin 35 by means of which the lever 37 is coupled to the side 22. A pin 40 serves as the fulcrum of the lever 37, and a spring 41 biases the pause slide 22 in the direction indicated by the arrow b Two pins 42 extending into slots 43 in the pause slide 22 limit longitudinal movement of this slide in the same manner as corresponding pins and slots in the handling slide 20.

FIG. 2 shows the apparatus of FIG. 1 in its pause state. Elements corresponding to those in FIG. 1 are indicated by the same reference numerals, and their description will not be repeated.

When the pause control pushbutton 19 is pushed to move the handling slide 20 in the direction indicated by an arrow c, the pause slide 22 is forced by the projection 26 to slide in the same direction as the arrow. As a result, the pinch roller 15 is first separated from the capstan 7 by the lever 37, and then the roller 11 of the bent arm 13 is separated from the periphery of the wheel 4 by the counterclockwise pivoting of the arm 13. The reason why the pinch roller 15 is first released is so that the magnetic tape will be instantaneously stopped.

The lock pin 25 of the handling slide 20 is moved into the channel 29 of the lock plate 21. Since the pin 33 engages the slot 32 of the lock plate 21 and the spring 31 is weaker than the spring 27 of the handling slide 20, as described above, the lock plate 21 is pulled in the direction indicated by an arrow d for a distance a determined by the length of the slot 32. In other words, the movement of the lock plate in the direction d corresponds to the over-stroke of the handling slide 20. Immediately before the handling slide reaches the position shown in FIG. 2, the leaf spring switch 34 is opened to stop the motor 5. This produces the pause state, which includes stopping of the tape and turning the motor power supply off.

FIGS. 4 and 5 show the relationship between the lock plate 21 and the pin 25 when the pin is held in the channel 29. As may be seen, the release member 30 is bent upwardly above the top of the pin 25.

When the pause control pushbutton 19 is again depressed to its over-stroke position while the apparatus is in the pause state, the lock plate 21 is able to be pulled by the spring 31 to close the leaf spring switch 34 and restart the motor 5. The pin 25 moves out of the lock portion 29 by sliding under the upwardly bent release member 30 so that upon release of the pushbutton 19, the spring 27 will pull the slide 20 back up, releasing the slide 22 to be pulled up by the spring 41, and thereby allowing the arm 13 to pivot clockwise so as to bring the roller 11 into engagement with the wheel 4. The lock plate 21 is somewhat loosely held so that it can pivot upwardly from the position shown in FIG. 5 to slide over the pin 25. The upward movement of the slide 22 pivots the lever 37 to allow the pinch lever 16 to be pivoted counterclockwise under the pressure of its spring to force the pinch roller 15 against the capstan 7. Magnetic tape captured between the pinch roller and the capstan will thereby be driven by the capstan and will be taken up by the take-up reel attached to the wheel 4. At this time the apparatus will have returned to the state shown in FIG. 1.

FIG. 3 is a graph showing the relationship between the respective movements of the pushbutton 19 and electric power to the motor 5 as the pushbutton 19 moves through a complete cycle from normal operation through a pause and back to normal operation. At the beginning it is assumed that the apparatus is operating in its normal condition either to playback or to record information on tape. At a certain time, pressure begins to be applied to the pushbutton 19 to initiate a pause. Such pressure must move the pushbutton all the way down to the overstroke position. Shortly after the pressure on the pushbutton 19 is released, the leaf spring switch 34 opens and the motor turns off. The apparatus remains locked in its pause condition for an indeterminate period of time with the motor off until pressure is again placed on the pushbutton 19 to force it into its over-stroke position. As it moves into the latter position, the leaf spring switch 34 is again closed causing the motor to be turned on. The latching connection between the slide 20 and the plate 21 is released in the second over-stroke position so that release of pressure on the pushbutton 19 allows the button to rise with the motor on and returns the mechanical linkage back to its tape-driving condition.

According to the invention described, the drawbacks of a conventional pause system are almost completely eliminated. In the pause operation of the present apparatus, the tape is instantaneously stopped and in addition, the battery is prevented from being run down because the motor power supply circuit is also opened during the pause. Upon resumption of normal operation, the motor is restarted and is back up to speed before the tape-driving mechanism is engaged.

While this invention has been described in terms of a specific embodiment, it will be understood by those skilled in the art that modifications may be made therein without departing from the true scope of the invention as defined by the following claims.

What is claimed is:

1. In a tape recorder comprising a motor, a capstan driven by said motor, a pinch roller, and resilient means pressing said pinch roller toward said capstan to grip tape between said pinch roller and said capstan and drive said tape in response to rotation of said capstan, the invention comprising:
  A. switch means connected to said motor to control the supply of power to said motor; and
  B. pause means for stopping the movement of said tape by separating said pinch roller from said capstan when said tape is moving, said pause means comprising:
    1. an actuator movable between a normal position and an over-stroke position and having a pause position between said normal position and said over-stroke position,
    2. separator means connected to said actuator and to said pinch roller to separate said pinch roller from said capstan when said actuator moves from said normal position toward said over-stroke position but not as far as said pause position; and
    3. linkage means connected to said actuator to be moved thereby and engaging said switch means in said normal position and in all positions of said actuator as said actuator moves from said normal position to said over-stroke position and from said over-stroke position back to said normal position, said linkage being disengaged from said switch means by said actuator when said actuator moves through said over-stroke position to said pause position and being returned to engagement with said switch means when said actuator moves from said pause position toward said over-stroke position, said actuator being able to reach said pause position from said normal position only by first moving to said over-stroke position and being able to return from said pause position to said normal position only by first moving back to said over-stroke position.

2. The invention according to claim 1 in which said tape recorder comprises:
  A. a take-up reel holder;
  B. transfer means to cause power to be transferred to said take-up reel holder, said transfer means having a driving position and pause position; and
  C. support means to support said pinch roller to permit movement thereof between a driving position in which said pinch roller is pressed against said capstan and a pause position in which said pinch roller is separated from said capstan, said linkage means connecting said pause control actuator to said support means and to said transfer means to move said support means and said transfer means between their respective driving positions and pause positions when said pause actuator moves between its normal position and pause position, said linkage means maintaining said support means and said transfer means in their respective pause positions as long as said pause actuator is between its pause position and its over-stroke position.

3. The invention according to claim 2 in which said linkage means comprises:
  A. a pause slide movable between a normal position and a pause position; and
  B. a spring resiliently biasing said pause slide to said normal position.

4. The invention according to claim 3 in which said switch means comprises:
  A. a switch having actuation means; and
  B. a pressure member resiliently biased against said actuation means to close said switch to supply electric power to said motor, said pressure member comprising a locking portion to engage said pause actuator only upon reaching the over-stroke position thereof to be drawn by said pause actuator upon return of the latter to said pause position to withdraw said pressure member from said actuation means and to allow said switch to open, thereby interrupting the supply of electric power to said motor.

5. The invention according to claim 4 in which said pressure member comprises a hook at a portion thereof facing said pause control actuator, and said pause control actuator comprises a pin to engage said hook when said pause control actuator reaches its over-stroke position.

6. The invention according to claim 5 in which said pressure member comprises a latch plate and said hook comprises a rounded surface facing said pause control actuator, said latch plate being mounted for limited pivotal freedom to be deflected by pressure from said pause control actuator and said pause control actuator pivoting said latch plate to engage said hook when said actuator is moved to its over-stroke position.

7. The invention as defined in claim 6 in which said latch plate comprises a channel, one edge of said channel being defined by an edge of said hook, and the other edge of said channel lying in the path of said pin to deflect said latch plate away from said pin when said pause control actuator is depressed from its pause position to its over-stroke position to disengage said pin from said hook.

8. The invention as defined in claim 7 comprising, in addition, a release member and a pin and slot connection guiding the movement of said latch plate and limiting the pivotal movement thereof in a direction to engage said hook and said pin on said pause control actuator to prevent said pin on said actuator from moving too deeply into said channel.

* * * * *